United States Patent [19]
Ueno et al.

[11] 3,912,568
[45] Oct. 14, 1975

[54] METHOD OF MANUFACTURING DRUMS OF METAL CANS

[75] Inventors: Hiroshi Ueno, Kawasaki; Fumio Kawasaki, Yokohama; Minoru Sasaya, Kawasaki; Kazuo Okubo, Tokyo, all of Japan

[73] Assignee: Toyo Seikan Kabushiki Kaisha, Tokyo, Japan

[22] Filed: Mar. 21, 1972

[21] Appl. No.: 236,401

Related U.S. Application Data

[63] Continuation of Ser. No. 839,461, July 7, 1969, abandoned.

[52] U.S. Cl. .............. 156/203; 156/218; 156/311; 156/320; 156/466; 156/498
[51] Int. Cl. ............................................. B29d 23/10
[58] Field of Search .......... 156/217, 218, 282, 311, 156/466, 498, 309, 203, 320, 327, 334, 332, 546; 161/214, 227, 231; 220/81; 260/404.5

[56] References Cited
UNITED STATES PATENTS

| | | | |
|---|---|---|---|
| 2,587,211 | 2/1952 | Piazze | 156/498 X |
| 2,623,444 | 12/1952 | Maier et al. | 156/320 X |
| 3,049,762 | 8/1962 | Jackson | 156/282 X |
| 3,066,063 | 11/1962 | Ecklund et al. | 156/218 X |
| 3,556,896 | 1/1971 | Schonberg et al. | 156/218 X |

*Primary Examiner*—William A. Powell
*Attorney, Agent, or Firm*—Holman & Stern

[57] ABSTRACT

The two seam edge parts of a sheet metal blank for forming the body of a can are previously provided with adhesive layers, which are lapped and caused by heating and pressing to fuse and thereby to be bonded together upon being cooled.

4 Claims, 10 Drawing Figures

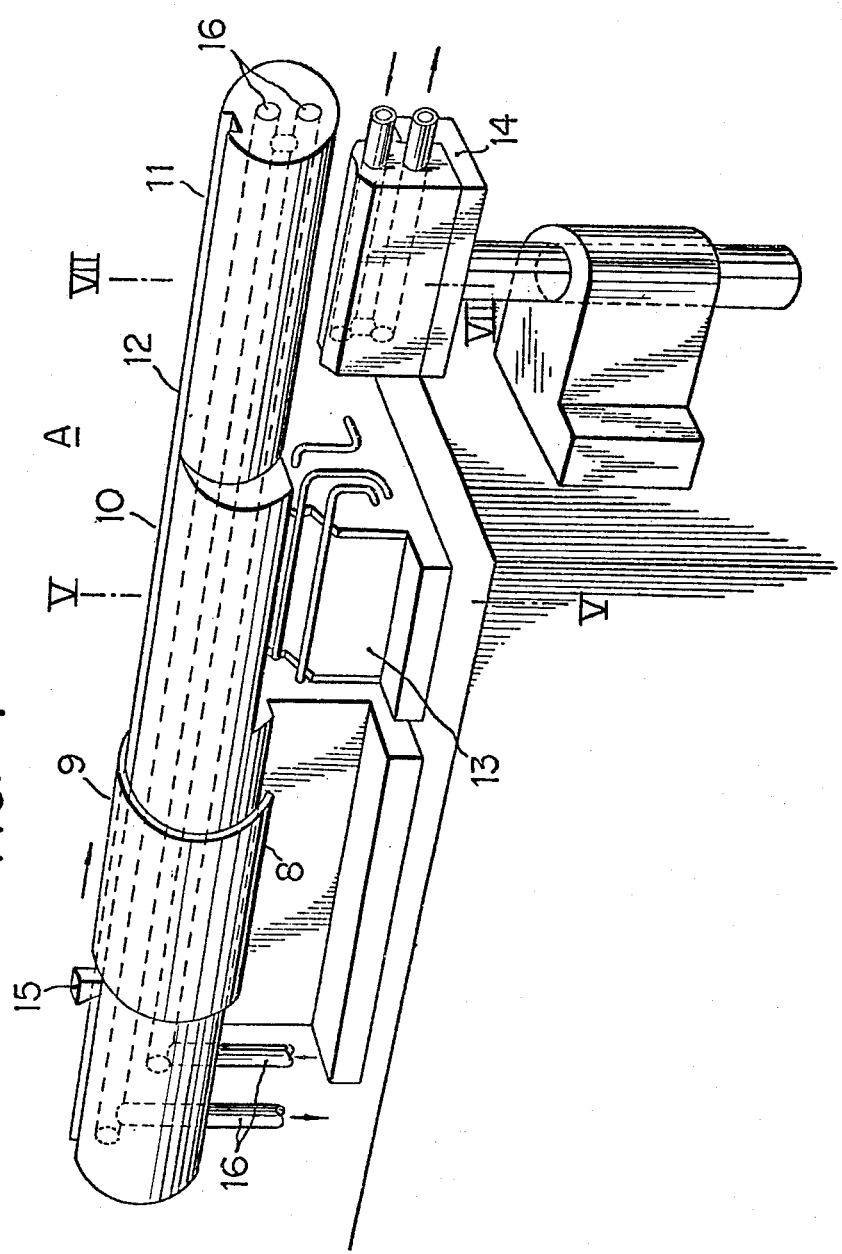

METHOD OF MANUFACTURING DRUMS OF METAL CANS

This is a continuation of application Ser. No. 839,461 filed July 7, 1969, now abandoned.

BACKGROUND OF THE INVENTION

This invention relates to a method for manufacturing the bodies of metal cans by utilizing metal sheet materials, in which method the portions of the bodies to be joined together are mutually bonded with an adhesive.

In the manufacture of bodies of metal containers, tin plate is ordinarily used as a material. A tin plate material is first cut into a rectangular form having predetermined dimensions thereby to prepare body blanks. Then, in the can manufacturing line, these body blanks are formed into cylindrical forms, and the edge portions to be joined together are shaped into hooks. These hook portions are then caused to mesh with each other to form a hook-seam and are soldered together.

However, because of the shortage of tin supply in the world market, materials other than tin plate in the can manufacturing industry have been widely developed, such as, for example, metal-plated steel sheets comprising thin steel sheet metal plated with chromium, aluminium and other like metals or chemically treated steel sheets having substratum thin sheets treated with chromic acid or phosphoric acid. These newly developed materials are increasingly used in place of tin plate as materials in the can-manufacturing industry.

However, since these new materials cannot be subjected to a bonding operation by soldering as in the case of tin plate, electric welding or bonding with adhesives is employed. In applying the adhesive bonding method, a hook-seam portion is first formed as in the case of the heretofore known soldering, and an adhesive of a hot-melt type in a molten liquid state is poured into the seam portion in place of solder.

It should be noted that a hook-seam portion has a low mechanical strength which is compensated for by the solder in the case of soldering. On the other hand, since the adhesives of a hot-melt type have a lower mechanical strength and lower heat-resistance and chemical-resistance than those of solder, the adhesives of this type cannot be readily used in the general manufacture of metal cans and have been limited to certain specific uses. Further, since thermoplastic resin adhesives having great toughness and high heat-resistance and chemical-resistance have a high viscosity in their molten state, this type of adhesive cannot be applied to the hook-seam portion by pouring thereinto. Therefore, the socalled overlap method in which the corresponding edge portions of the drum body blank are laid to overlap each other to be bonded with adhesives has been adopted instead of forming a hook-seam portion for applying this thermoplastic resin adhesive.

Among adhesives of this type which are suitable for the overlap process, there has been developed for example, Nylon-12 which is a metal-to-metal adhesive having excellent characteristics. The term "metal" which is used herein includes metals having coated surfaces. Metal cans produced by the overlap bonding process are superior to those manufactured by the heretofore known hook-seam process from the viewpoints of mechanical strength and appearance. Therefore, the bonding process of the overlap type is required not only for bonding the new materials for can manufacturing but also for the known tin-plate materials. In fact, some excellent cans have been manufactured in trail production process.

However, these trial products have several disadvantages from the viewpoint of industrial production. Consequently, the new bonding process of the overlap type has not yet been applied successfully in a high-velocity can-manufacturing line having a capacity of more than 250 cans per minute as in the heretofore known line of the soldering process.

When can bodies are manufactured in a high-velocity can-manufacturing line, the treating time period in each process corresponds to 200 milliseconds per can, including therein the transferring time period of the can. That is, each treatment must be carried out in this time period of 200 milliseconds. In the usual bonding process using resin adhesives, there are included inevitably a process of heating the resin adhesives and another process of the cooling and setting thereof. These two processes must be included within a time period of 200 milliseconds. Further, the later process, i.e., process of cooling and setting, comprises an overlapping time as described hereinafter. Therefore, the time period which can be used purely for cooling and setting of adhesives is strictly limited to within 100 milliseconds.

The above described disadvantage of the new process of the overlapping type is due to the fact that it is difficult to obtain full bonding strength between metal-resin (adhesive)-metal unless the resin used is rendered completely molten by heating it to a considerably higher temperature than its melt point in order to obtain full bonding in a short time period of treatment in a can-manufacturing line as described above. Such a necessity of heating to a high temperature results in the following practical problems.

In the first place, the materials of the coating or plating layer on the surface of the can substrate material are modified or deteriorated by the heating treatment at the high temperature depending on the characteristics of the applied coating or plating materials. For example, Nylon 12, which is one of linear polyamide resins, and which is the most preferable adhesive for the purpose of bonding metal to metal in a short time period, must be heated to a temperature exceeding 250°C in order to obtain a good bonding within a time period of 100 milliseconds. Therefore, in the case of bonding tin plates, these materials must be heated to a temperature exceeding the melting point of tin, i.e., 232°C, whereby the tin layer covering metal substrate will be melted. Consequently, this method is not practical.

The second problem is that the can body blank shaped into cylindrical form in the can-manufacturing line is subject to a springback force urging the blank to recover its original plane form due to its elasticity. This requires that the blank of cylindrical form be held in a mechanical manner to prevent separation of the bonded edge portions until the adhesive which has been once heated and is in a molten state is cooled again to a temperature below its melting point and is solidified. However, as the material is heated to a high temperature, its cooling in a short time becomes more difficult, and the time necessary for holding the bonded portion of material in a mechanical manner becomes longer, thereby limiting the highest velocity of the can-manufacturing line. In the case where the above described Nylon-12 is used as an adhesive, for example, when the nylon adhesive is heated to 250°C, there can be found no suitable cooling method satisfying the above described strict condition of a cooling and setting time period, within 100 milliseconds, of the adhesive which is required for a high-velocity can-manufacturing line having a capacity exceeding 250 cans per minute. Consequently, high-velocity manufacturing becomes impossible in this case.

SUMMARY OF THE INVENTION

Therefore, an essential object of the invention is to provide a method for manufacturing at a high velocity can bodies of metallic containers, in which method the edge portions of a blank of said can bodies are bonded together by means of an adhesive of a thermoplastic resin, without the disadvantages encounted in the heretofore known method, particularly without modification or deterioration of the coating layer on the surface of the can substrate material.

Further, another object of the invention is to provide a can body forming device which is particularly advantageous for carrying out the method according to the invention.

The foregoing essential objects and other objects as well as detailed features of the invention will become more apparent and more readily understandable from the following description when read in conjunction with the accompanying drawings.

BRIEF DESCRIPTION OF THE DRAWINGS

FIG. 4 is a schematic perspective view of one example of the apparatus according to the invention;

DETAILED DESCRIPTION OF THE INVENTION

Prior to a detailed description of the invention, the general mechanism of the adhesion of a thermoplastic resin adhesive will be considered for the purpose of rendering more understandable the principle of the invention.

Thermoplastic resins can be generally divided into crystalline macromolecules and non-cyrstalline macro molecules. The adhesives which can be used in high-velocity can manufacturing according to the invention are limited to crystalline macromolecules, the crystallization of which proceeds at a temperature below their melting points, whereby adhesives are solidified very rapidly. On the other hand, since non-crystalline macromolecules assume a rubberlike state after being applied at a high temperature and cooled on the surface of can material, the can body blank has been shaped into a cylindrical form tends to return to its original planar form because of its springback force due to elasticity thereby to separate the bonded portions of the blank.

Figure 1:
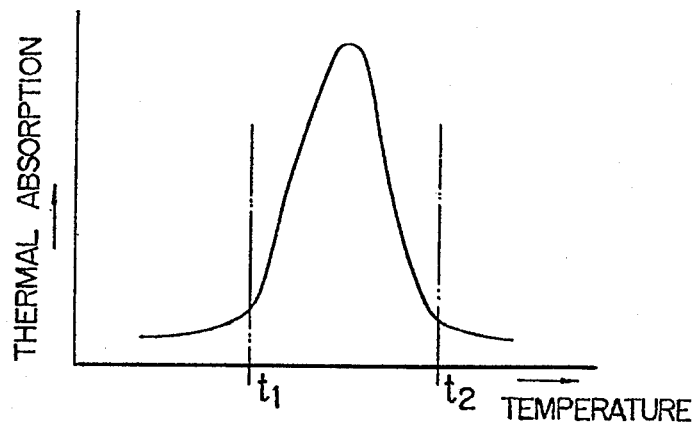
FIG. 1 is a graphical representation indicating the thermal absorption quantity - temperature characteristic of an ordinary adhesive.

FIG. 1 is a graph showing qualitatively the temperature - thermal absorption characteristic of a crystalline thermoplastic resin when the temperature thereof is increased at a constant rate. As is clear from this representation, when the temperature is gradually increased to $t_1$, the crystals of resin begin to melt, and the thermal absorption rapidly increases. When the temperature is further increased to $t_2$, and the crystals therein are almost completely melted, the thermal absorption begins to decrease. The aforesaid "melting point" designates, in the accurate meaning of the words, the temperature $t_1$ at which the crystals being to melt.

More specifically, bonding metal to metal by means of a resin adhesive is obtaining a metal-adhesive-metal bond by using an adhesive as a medium. In the heretofore known metal-metal bonding process, there has been used, exclusively, the method in which a resin adhesive is sandwiched between metal parts to be bonded together and is heated thereby to obtain bonding between metal and resin. Such bonding between metal and resin is caused by a "wetting" phenomenon of the molten resin with respect to the surface of the metal. In order to obtain such a wetting state or phenomenon, the resin must be given a sufficient thermal absorption quantity to be in a molten state. Therefore, it is necessary to heat the resin to a temperature exceeding $t_2$ thereby to render this resin rapidly into a molten state or to heat it for a long time at a temperature below $t_2$ in a molten state. However, the disadvantage caused by the heating at a temperature exceeding $t_2$ is as described above, and no description will be necessary on the point that heating for a long time at a temperature below $t_2$ cannot be adopted in a high-velocity can manufacturing.

While bonding between different substances as metal-resin bonding requires the molten state of the resin as described above, bonding between substances of the same kind, for example, resin-to-resin bonding, proceeds by the self-diffusion phenomenon of the resin, and this phenomenon does not necessarily require a fully molten state of the resin used. In general, the self-diffusion velocity of resin rapidly increases when the temperature of resin exceeds a limit at which crystals of resin begin to melt, i.e. $t_1$. However, the limit temperature varies largely depending on the kind of resin used. Therefore, by selecting a resin adhesive having a high self-diffusion velocity, and by using the resin in its state exceeding its melting point $t_1$, the adhesion between the resin and resin proceeds for a very short time and at a low temperature thereby to reduce the time period necessary for cooling and setting the resin.

This invention utilizes such a characteristic in the adhesion phenomenon. More specifically, the self-diffusion velocity of a resin is indicated by the self-diffusion coefficient of the resin, and this coefficient can be determined by the Buech - Cashin - Debyl formula. However, the value this self-diffusion coefficient changes with the temperature of the resin. With respect to the problem with which we are concerned, we need the self-diffusion coefficient at the melting point $t_1$. But, because of the very complicated determination of the self-diffusion coefficient itself, no information concerning the self-diffusion coefficients at the melting points of resins has been disclosed. Therefore, selection of resinous adhesives by comparison of self-diffusion coefficient values has been impossible.

Under these conditions, however, we have directed our attention to the self-diffusion coefficient of a resin at the glass-transition point which has a correlation to the melting point (at which glass-transition point, the resin is liberated from its frozen state at low temperatures, and micro-Brownian motion of molecular chain segments starts, the glass-transition point in a crystalline macro-molecule, appearing at a temperature, in absolute temperature degrees, corresponding to about two thirds of that of the melting point), and we have presumed that resins having high self-diffusion coefficients at the glass-transition points have also high self-diffusion coefficients at their melting points.

As a result of our various experiments under this presumption, we have found that thermal plastic resins as adhesives having a self-diffusion coefficient exceeding $6.0 \times 10^{-21}$ cm$^2$/sec. at the glass-transition, and point, such as linear polyamide resins (Nylon-6, Nylon-66, Nylon-11, Nylon-12, for example) and linear polyester resins (polyethylene terephthalate, for example), have a high self-diffusion velocity also at their melting point, and that adhesion between resin and resin of this type can be carried out in a very short time period. Therefore, by applying in advance a resin of this type on two confronting surfaces in the portion to be bonded thereby to utilize the adhesion between resin and resin in a can manufacturing process, an adhesion process at a low temperature and for a short time period can be rendered possible, thus attaining the object of the invention.

As described above, it is necessary according to the invention to select a resinous adhesive having a high self-transition coefficient at the glass-transition point. In using polyethylene or polypropylene having a low self-diffusion coefficient, when adhesion between resin and resin is carried out in the proximity of its melting point, a time interval exceeding 500 milliseconds is necessary for the process. This long time interval cannot be applied in high-velocity can manufacturing.

Table I sets forth the above described glass-transition point, self-diffusion coefficient at this point and melting point of various resinous adhesives. With respect to some resins in Table I, the relation between their glass-transition point and melting point deviates from the above described relationship. Nevertheless, the self-diffusion coefficient at the glass-transition point can be used for determining the adhesion speeds of these resins.

Table I

| Kind of adhesive | Melting Point, °C | Glass-transition Point, °C | Self-diffusion coefficient at glass-transition point, °(cm$^2$/sec.) |
| --- | --- | --- | --- |
| Nylon - 6 | 250 | 53 | $6.6 \times 10^{-21}$ |
| Nylon - 66 | 215 | 57 | 7.5 × " |
| Nylon - 11 | 184 | 53 | 6.7 × " |
| Nylon - 12 | 173 | 53 | 6.2 × " |
| Polyethylene Phthalate | 250 | 69 | 7.4 × " |
| Polyethylene | 120 | −125 | 2.9 × " |
| Polypropylene | 155 | −10 | 3.5 × " |

The method according to the invention is characterized by the steps of coating in advance the opposite end portions to be bonded together of a can body blank with band-shaped films of crystalline thermal plastic resinous adhesive having a self-diffusion coefficient exceeding $6.0 \times 10^{-21}$ cm$^2$/sec., heating said opposite end portions of the blank thereby to increase temperature of the applied adhesive up to its melting point or to a temperature slightly higher than the melting point, overlapping said end portions in such a manner that said applied and heated adhesive layers confront each other, and pressing and cooling the resulting overlapped portion.

The process according to the invention for manufacturing can-bodies is described hereinafter more in detail with reference to the drawings. FIG. 2 shows each step of the process, In FIG. 2 (a), a can body blank 1 has its opposite edge portions coated in advance with adhesive layers 2, 2a. This blank 1 has a width W corresponding to the circumferential length of a can body plus the width of edge portions to be overlapped.

In manufacturing can body blanks, the areas to be bonded together at the opposite edges in the widthwise direction of a band-shaped metal sheet having a width of W are coated in advance with narrow band-shaped films of an adhesive. Thereafter, the metal sheet is cut into pieces having a length corresponding to the length of the can body. It goes without saying that the band-shaped metal sheet can be first cut into can body blank sizes, with the adhesive then being applied thereon.

In this case, since adhesion of the adhesive is caused between metal and resin, a relatively long time period is necessary for full adhesion. However, in this adhesion process in which an adhesive is caused only to adhere to a plane metal sheet unlike the can-manufacturing process in a can-manufacturing line, there is no outer force causing the applied adhesive to be separated from the substrate metal sheet. Therefore, there is no possibility of the once melted resin being separated from the substrate even when the resin is not thoroughly cooled and solidified. Consequently, in this adhesion process, the time interval in which the metallic sheet coated with an adhesive is transferred to the following process can be utilized for cooling and solidifying the applied adhesive resin. This adhesion process thus causes no inconvenience in a high-velocity operation in the can-manufacturing line.

Figure 2A:
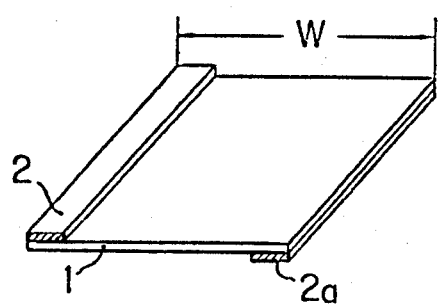
FIGS. 2(A), 2(B), 2(C), and 2(D) are schematic views showing respectively different steps of process of the method according to the invention.
Figure 2B:
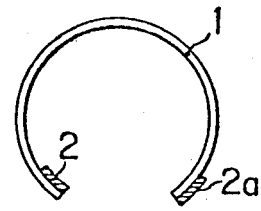

FIGS. 2(B) to 2 (D) show the respective steps of working the resulting blank into a can drum body. It is usually preferable to carry out these steps in a high-velocity can manufacturing line. In step (B), a can body blank is shaped into a cylindrical form having opposite edge portions separated from each other. The separated position of edge portions is preferable for the ease of the following heating operation.

In the following step, (C), the opposite edge portions of the cylindrically shaped blank are heated. As described above, the adhesive on the edge portions are heated to the temperature $t_1$ or a temperature slightly higher than $t_1$ in this step. If the adhesive is heated to a temperature lower than $t_1$, mutual diffusion velocities between two layers of adhesive are decreased thereby to bring about an imperfect bonding. Therefore, this heating operation must be carried out very accurately and rapidly. For this purpose, a high-frequency conductive heating system is advantageously used as the heating source.

Figure 2C:
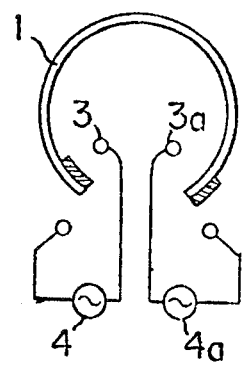
Figure 2D:
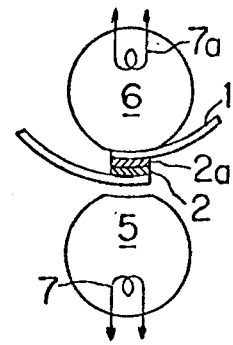

In FIG. 2(C) showing the heating step, high-frequency conductive heating coils 3, 3a are connected to respective high-frequency sources 4, 4a. In the following step (D), the heated opposite edge portions of the blank are laid to overlap each other, with adhesive layers 2, 2a confronting each other, and this overlapping portion is pressed while the adhesive is cooled and solidified.

Since this step (D) of pressing, cooling and solidifying must be carried out for a short time in such a manner to fit a high-velocity operation, hammering by means of metal members is used in the method according to the invention. The metal members comprise a mandrel 6 which is fixed in place and a hammer 5 which is movable by a suitable source of driving force to be driven toward the mandrel 6. By inserting the overlapping portion of can body material between the hammer 5 and the mandrel 6 and by driving the hammer 5 toward the mandrel to hammer the overlapping portion, the adhesive layers 2, 2a are strongly pressed against each other, and, at the same time, the heat contained in the adhesives 2, 2a is removed from the metal members 5, 6 by thermal conduction. Thus, the adhesive layers 2, 2a are cooled and solidified very rapidly and are fully bonded together. In the conduction of heat, the quantity of heat conducted between two media increases with the temperature difference therebetween. Therefore, it is usually necessary to cool the metal members 5, 6 by means of a suitable cooling medium 7, 7a. It is also necessary to cause the metal members 5, 6 and the overlapping portion to contact each other as completely as possible thereby to afford thermal conduction uniformly on the whole surface of the overlapping portion. Through the above described steps (A) – (D), bonding of the body material is completed. Change of temperature in the adhesive and the time through this process are graphically shown in FIG. 3.

Figure 3:
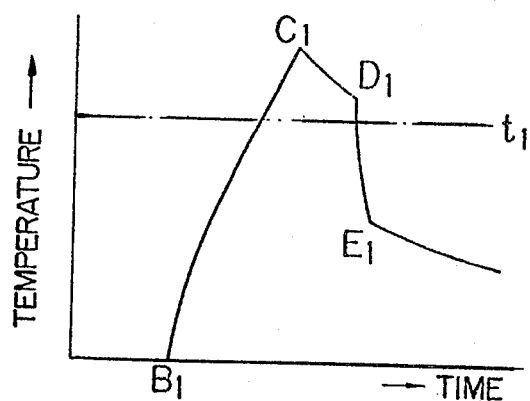
FIG. 3 is a graphical representation indicating the change in temperature of an adhesive according to the invention with time.
Figure 5:
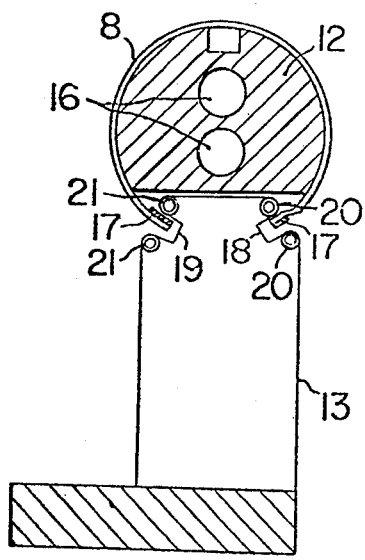
FIG. 5 is a cross-sectional view taken along the plane indicated by line V — V in FIG. 4.
Figure 7:
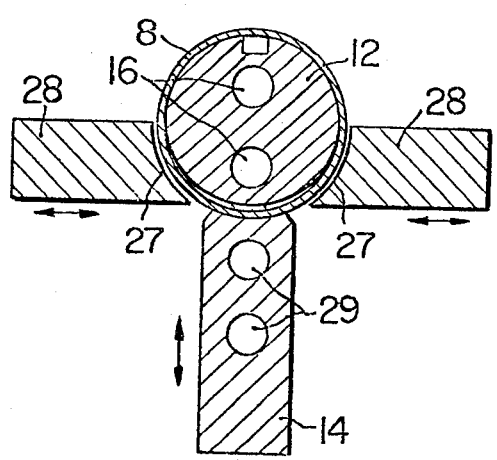
FIG. 7 is a cross-sectional view taken along the plane indicated by line VII — VII in FIG. 4.

In FIG. 3, time is represented by the abscissa, and the temperature of the adhesive by the ordinate. The state shown in FIG. 2 (B) corresponds to $B_1$ in FIG. 3. As described above, opposite edge portions of can body blank are heated by high-frequency conductive heating in step (C), wherein the temperature of the adhesive rises to $C_1$ shown in FIG. 3 slightly higher than the melting point $t_1$ of the adhesive. The time elapsing from $B_1$ to $C_1$ can be held less than 200 milliseconds by means of the high-frequency conductive heating method. The overlapping state of edge portions as shown in step (D) of FIG. 2 is realized in fact while transferring the blank from step (C) to step (D), and during this transfer of the blank, the temperature of the adhesive decreases slightly to a $D_1$ as shown in FIG. 3. This decrease in temperature is so slight that it can be almost neglected.

Then, through hammering by means of metal members 5, 6 in step (D), the temperature of the adhesive decreases to $E_1$, and the adhesive solidifies. The time period from $C_1$ to $E_1$ is also less than 200 milliseconds. While a can body blank is being treated in step (D), the following blank can be passed through step (C). Therefore, in a can-manufacturing line, less than 200 milliseconds are necessary for one can so that more than 300 cans per minute can be treated. Temperatures at respective steps should be varied according to the adhesive used. The specific temperatures according to respective adhesives are shown in the following examples.

EXAMPLE 1

| | |
|---|---|
| Metallic material | Tin plate |
| Adhesive | Nylon-12 (Melting point 173°C) |

When 300 cans per minute were manufactured according to the method of the invention with the above mentioned materials, the following results were obtained.

| | |
|---|---|
| Heating time of edge portions (from $B_1$ to $C_1$ in FIG. 3) | 180 milliseconds |
| Heating temperature of adhesive | 180°C |
| Cooling time (from $D_1$ to $E_1$ in FIG. 3) | 70 milliseconds |

In can bodies thus obtained in this line, tin layer of tin plate has not been modified or deteriorated at any point and bonding strength was found sufficient. For the sake of comparison, we have carried out an experiment in which one of edge portions of the can body blank was coated with the adhesive according to the usual method. In this case, a heating up to a temperature exceeding 250°C was necessary for obtaining the same order of bonding strength as that obtained in the above example. Such heating resulted in melting of tin layer of tin plate, so that no usable product was obtained.

EXAMPLE 2

| | |
|---|---|
| Metallic material | Electrolysis-treated steel plate (High-Top manufacture by "Toyo-Kohan") |
| Adhesive | Mylar Film (Melting point 250°C) |

When 300 cans per minutes were manufactured according to the method of the invention with the above mentioned materials, the following results were obtained.

| | |
|---|---|
| Heating time of edge portions (from $B_1$ to $C_1$ in FIG. 3) | 180 milliseconds |
| Heating temperature of adhesive: | 260°C |
| Cooling time: (from $D_1$ to $E_1$ in FIG. 3) | 70 milliseconds |

Bonding strength in this case is relatively less than that obtained in the preceding example while using Nylon-12 as adhesive. Further, since the adhesive herein used, Mylar Film, having a higher melting point, i.e. 250°C, must be heated up to 260°C, this adhesive can not be applied to tin plate material, but can be used on recently developed steel plates without tin.

Mylar film is a polyethylene terephthalate film developed by Dupont Company and is a trademark.

As an experiment, we have prepared with the same materials a can body blank, only one of edge portions of which blank is coated with Mylar Film, and we have worked this blank into a can body with the same production ratio of 300 cans per minute. But, the blank could not be formed into a can body because of incomplete bonding.

As described above, an adhesive used according to the invention is thermally applied on the surface of the blank which is, in advance, heated by high-frequency heating. Consequently, said adhesive firmly adheres to the metallic surface of the blank. Further, since adhesive layers are then thermally bonded together, the resulting bonding strength is considerably larger than that obtained by only sandwitching an adhesive between metallic blanks and by heating. In this case, the two confronting adhesive layers should be instantaneously heated up to a necessary temperature only in their portions in the vicinity of their surfaces. At the same time, the heating temperature should be uniform all over the surfaces of the adhesive layers. Further, these adhesive layers should be subjected to a pressing operation immediately after the heating, simultaneously while being cooled rapidly. These objects can be effectively attained by means of a can-manufacturing device as described below according to the invention. FIGS. 4 – 7 show such a device A according to the invention.

This device A is provided in series with a blank wrapping station 9 in at which container material or a blank 8 is firstly wrapped around a cylinder, heating station 10 for heating adhesive layers which have been caused to adhere to edge portions of said blank 8, and can body forming station 11 in at which the edge portions of said blank are joined together in such a manner to cause said adhesive layers on said edge portions to confront each other and are hammered to form a solid unitary body. Further, this device A has as its elements a forming cylinder 12 which is cooled approximately along its whole length, a high-frequency heating device 13 for heating instantaneously the band-shaped adhesive layer respectively applied on one surface of respective edge portions of said blank 8, and a hammer 14 which is cooled by any suitable cooling medium for hammering joined portion of a formed can body.

The cylinder 12 is provided with a reciprocating feeding bar (not shown) in a longitudinal groove in its outer surface, and a feeding pawl 15 fixed to said feeding bar drives forwards intermittently by predetermined distances said blank 8 wound around the cylinder 12. Further, the cylinder is provided in its approximate center portion with cooling liquid tubes 16 approximately along its whole length, and a cooling liquid having a temperature of about - 30°C is caused to circulate through said tubes 16.

A wound blank 8 is driven by the above described manner into the heating station 10, wherein a guiding member (not shown) located outside of the cylinder reduces the diameter of said wound blank 8 whereby its opposite edge portions are caused to approach to each other. Respective surfaces of the edge portions to be caused to confront each other are coated in advance with a certain type of nylon adhesive 17. These coated surfaces are caused to pass through respectively heating members 18, 19 of the high-frequency heating device 13. During this passage, only the surface portion of said adhesive 17 is instantaneously heated. The heating members 18, 19 of said high-frequency heating apparatus 13 are provided respectively with heating coils 20, 21 in opposing relationship to each other in the direction in the edge portions of blank 8 pass through the heating members 18, 19. The length of these heating members is slightly less than that of said edge portions of the blank. Generally in case of a high-frequency heating, the so-called edge effect occurs in acute-angle portions such as edge portions of blank and causes local excess heatings, which result in decrease of bonding strength. This phenomenon can be eliminated by shortening slightly the length of hearing members.

Figure 6:
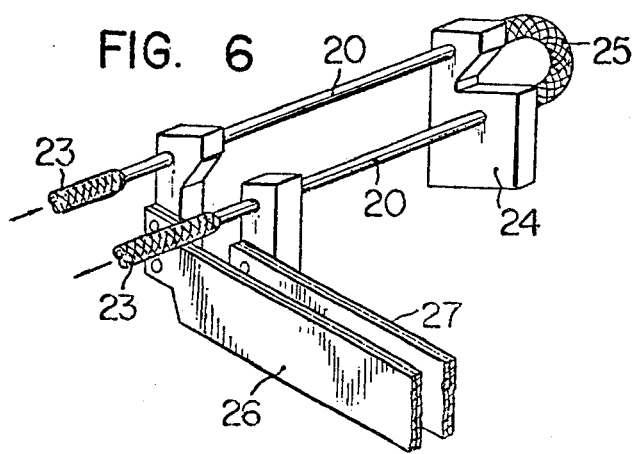
FIG. 6 is a perspective view of a heating member in a high-frequency heating device of the apparatus shown in FIG. 4.

FIG. 6 shows a portion of the heating member, in which a cooling liquid is circulated through the hollow portions of heating coils 20, 21 by means of a cooling-liquid tube 23 and circulating tube 25, and a short-circuiting member 24 is provided at the bent portion of a conductor. Further, conductors 26, 27 are connected to a high-frequency power source (not shown).

Blank 8 is then driven to the can body forming station 11, wherein molds 28, 28 having end portions 27, 27 shaped almost similar to the lower half of the circular arc of the blank 8 of approximate circular form approach thereby the blank from both sides thereby to press said lower half of the blank and to cause its edge portions to overlap each other for a certain width in such a manner that the above described adhesive layers 17 confront each other.

Then, the hammer 14 hammers immediately the resulting overlapping portion or can body joined portion thereby to form the adhesive layers into a unitary structure to thus complete a can body.

Said hammer 14 is provided therethrough with cooling-liquid tubes 29 in which a cooling liquid of about −30°C circulates.

The above described can body forming operation is carried out in practice at a high-velocity of several hundred cans per minute. As described above, in order to obtain a sufficient bonding strength at the joined portion of a can body, it is necessary to heat instantaneously only the surface portion of adhesive layers applied in advance on edge portions of the blank and to cause the heated adhesive surfaces to confront each other to be subjected to immediate hammering while being cooled and solidified.

According to our experiments, the above described adhesive is heated up to a tempeature in the range of 220° – 240°C. At this moment, since the cylinder is cooled by means of a cooling liquid of about −30°C, the blank is held in a sufficiently cooled state. Consequently, the adhesive layer reaches its melting temperature only at the portion very near to the surface thereof.

Since the hammer is also cooled in the same way as the cylinder, the above described adhesive is rapidly cooled at hammering operation thereby to solidify the adhesive layers into a unitary structure. In practice, immediately after heating up to 220° – 240°C and hammering, the adhesive is rapidly cooled to about 140° – 160°C; difference of temperatures reaching thus several tens of degrees.

We claim:

1. A method for the mass production at a high velocity of can bodies from a metallic blank including the successive steps of bonding a layer of a crystalline thermoplastic resinous adhesive having a self-diffusion coefficient exceeding $6.0 \times 10^{-21} cm^2/sec$ onto opposed longitudinal edges of a substantially flat can body blank, shaping the blank into substantially cylindrical form with the opposed longitudinal edges separated from each other, applying heat from within the shaped blank to the opposed longitudinal edges of the body blank so as to elevate the temperature of said adhesive to at least the melting point of said adhesive, confronting and superimposing said longitudinal edges between a cooled hammer and mandrel upon said temperature elevation so as to cause said heated adhesives of said longitudinal edges to confront each other and then driving the hammer towards the mandrel so that the layers are strongly pressed together and at the same time the heat contained in the layers is removed from the hammer and mandrel by thermal conduction whereby the layers are cooled and solidified and fully bonded together, with the time required for the superimposing, pressing and cooling being effected within 200 milliseconds per can body.

2. A method for the mass production at a high velocity of can bodies from a metallic blank including the steps of heat bonding a shaped film of a crystalline thermoplastic resinous adhesive having a self-diffusion coefficient exceeding $6.0 \times 10^{-21} cm^2/sec$ onto opposed longitudinal edges of a substantially flat can body blank, shaping the blank into substantially cylindrical form with the oppposed longitudinal edges separated from each other, applying heat to the opposed longitudinal edges of the body blank so as to elevate the temperature of said adhesive to at least the melting point of said adhesive, confronting and superimposing said longitudinal edges between a cooled hammer and mandrel upon said temperature elevation so as to cause said heated adhesives of said longitudinal edges to confront each other and then driving the hammer towards the mandrel so that the films are strongly pressed together and at the same time the heat contained in the films is removed from the hammer and mandrel by thermal conduction whereby the films are cooled and solidified and fully bonded together, with the time required for the superimposing, pressing and cooling being effected within 200 milliseconds per one can body.

3. The method for the mass production at a high velocity of can bodies from a metallic blank as claimed in claim 2 in which said crystalline thermoplastic resinous adhesive is nylon 12.

4. The method for the mass production at a high velocity of can bodies from a metallic blank as claimed in claim 2 in which the heat is applied from within and without the shaped blank to the longitudinal edges of the body blank.

* * * * *